United States Patent [19]
Chalich

[11] 4,271,960
[45] Jun. 9, 1981

[54] CONVEYORS AND CHAIN
[75] Inventor: Charles Chalich, Salisbury, N.C.
[73] Assignee: Taylor Manufacturing Company, Salisbury, N.C.
[21] Appl. No.: 95,328
[22] Filed: Nov. 19, 1979

Related U.S. Application Data
[63] Continuation-in-part of Ser. No. 961,999, Nov. 20, 1978, abandoned.

[51] Int. Cl.³ .............................................. B65G 17/24
[52] U.S. Cl. .................................... 198/779; 198/851
[58] Field of Search ............... 198/850, 851, 853, 779; 74/245 C, 250 C, 251 C

[56] References Cited
U.S. PATENT DOCUMENTS
2,481,130  9/1949  Lindemuth ...................... 198/779 X
2,954,113  9/1960  Hibbard et al. ...................... 198/851

FOREIGN PATENT DOCUMENTS
990782  5/1965  United Kingdom ..................... 198/850

Primary Examiner—Jeffrey V. Nase

[57] ABSTRACT

A conveyor chain and conveyors using such chain in which a plurality of elongate links are joined together with a plurality of pins and a plurality of spacers. Each pin penetrates terminal end portions of two pairs of links for chaining the links into first and second spaced apart side length portions and the links and pins cooperate for transmitting tensile stress imposed on the chain. Each of the plurality of spacers is penetrated by at least one pin and has a carrier portion projecting laterally from the chain for engaging an object to be moved with the chain. As used in certain specific conveyors, the conveyor chain includes clips for receiving and gripping rod-like axles and grippers for partially encircling a pair of objects to be moved with the chain, all as described more fully hereinafter.

9 Claims, 19 Drawing Figures

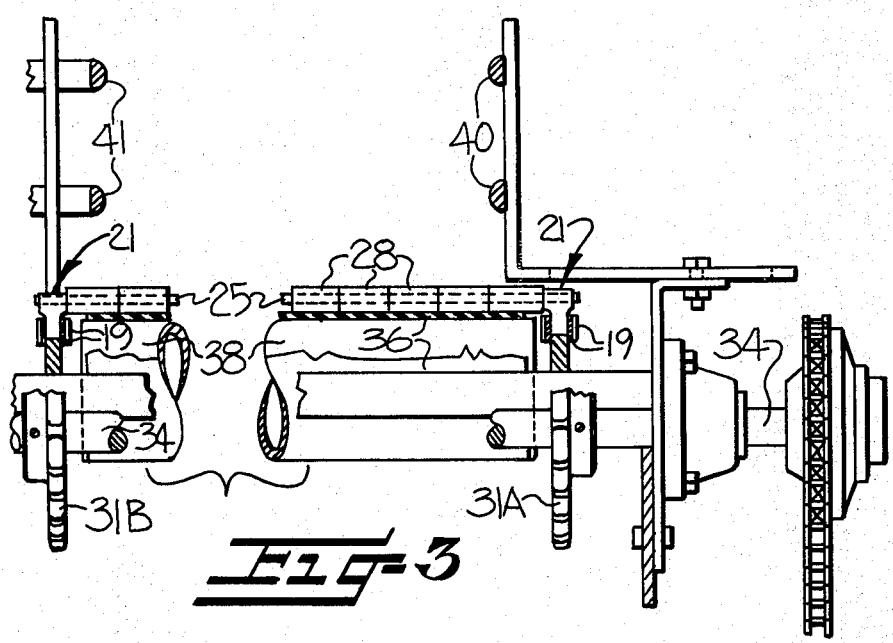
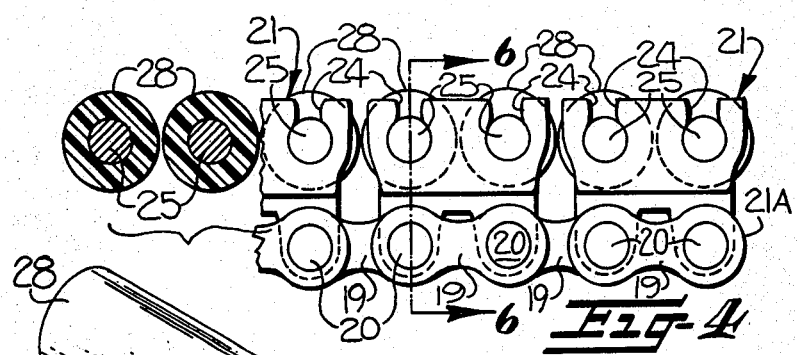
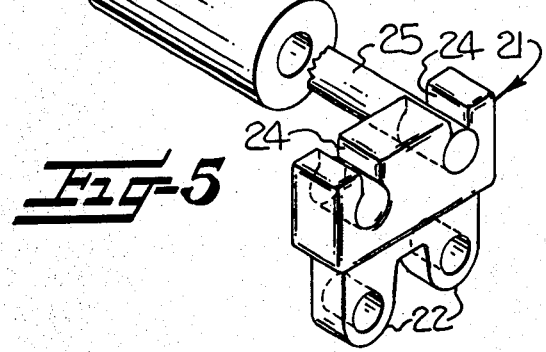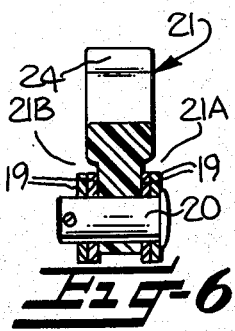

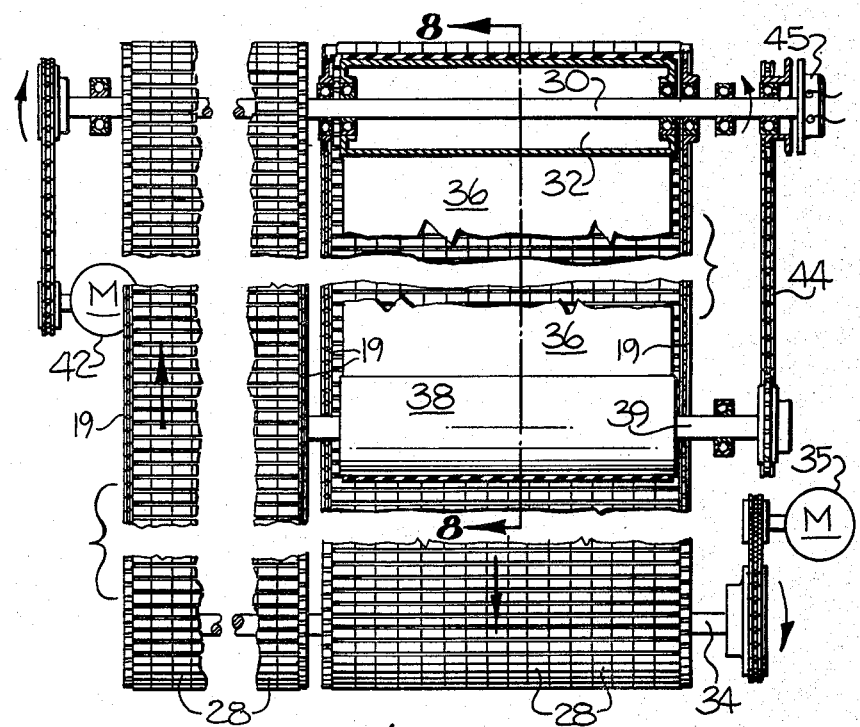
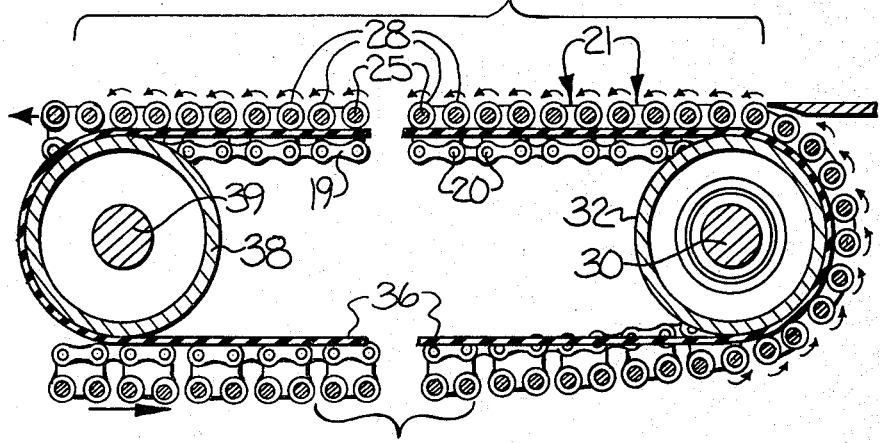

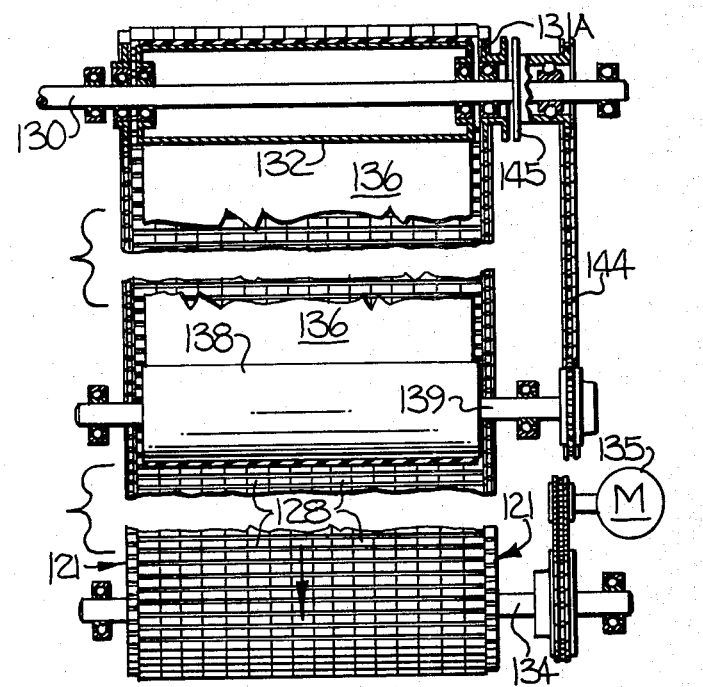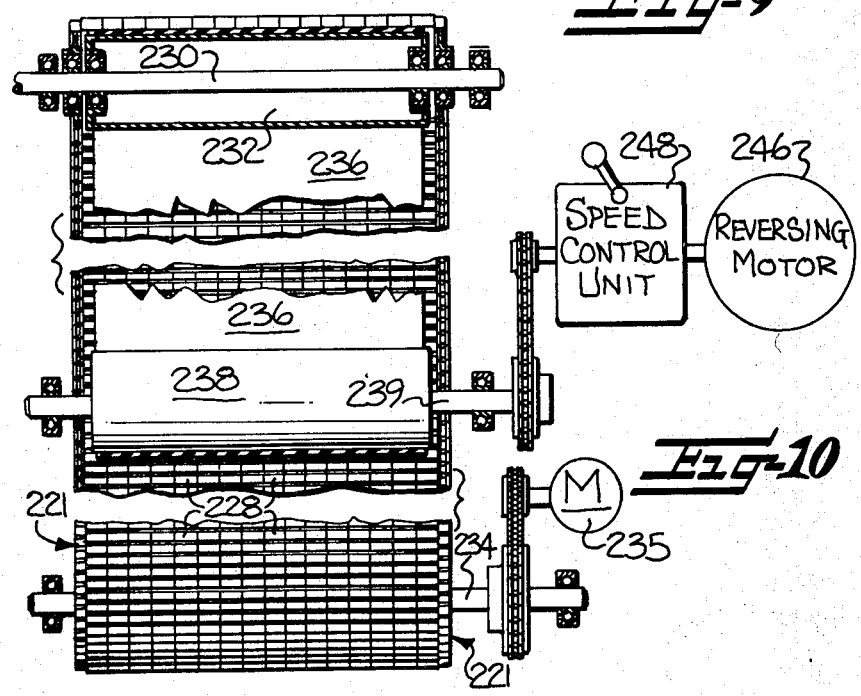

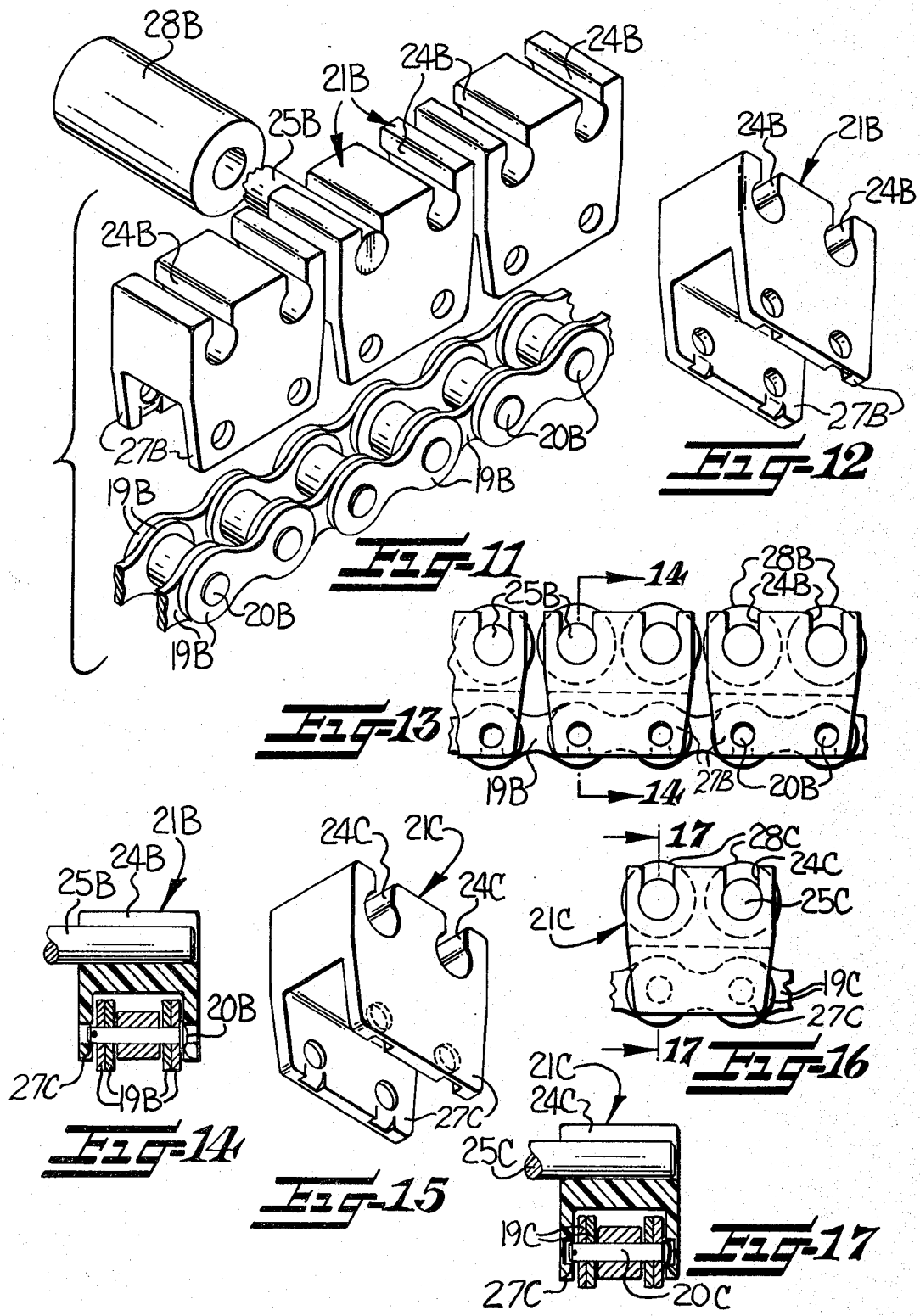

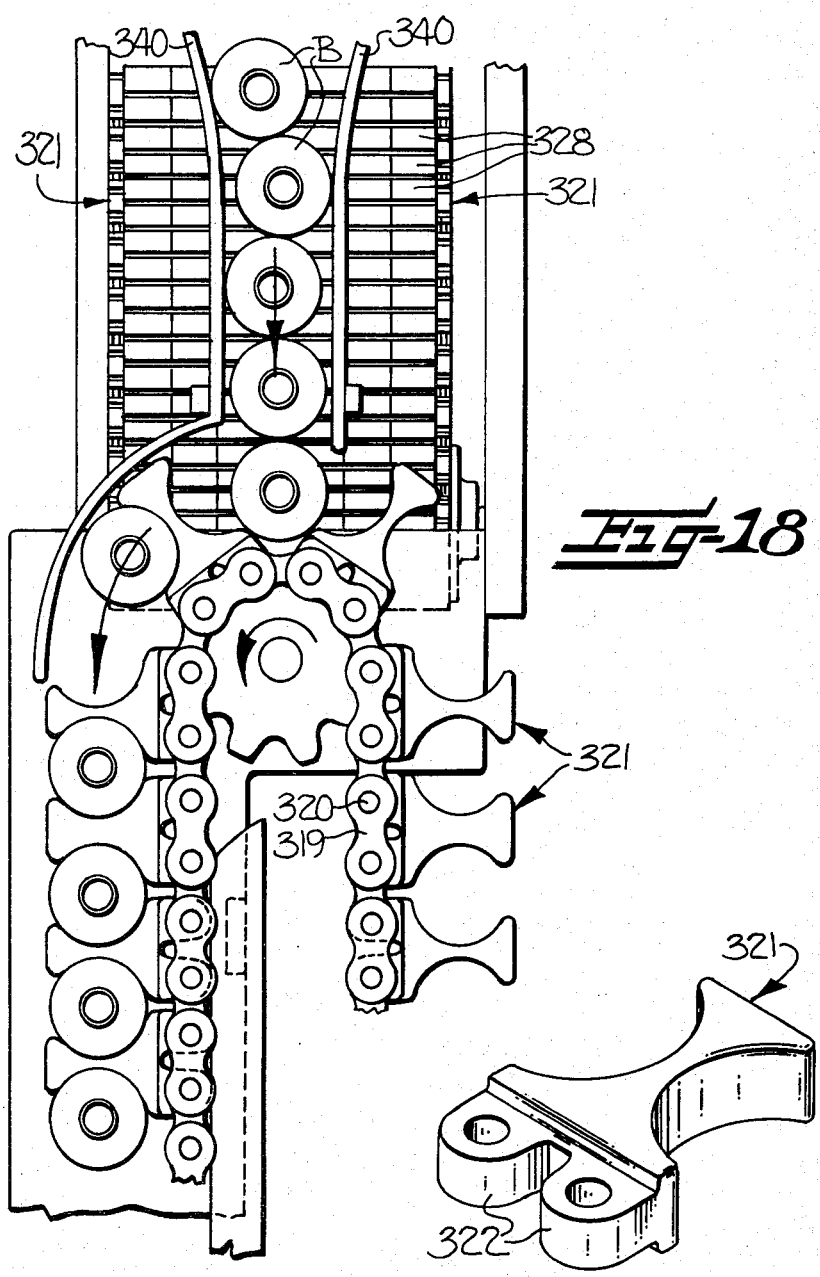

CONVEYORS AND CHAIN

RELATED APPLICATIONS

This application is a continuation-in-part of copending application Ser. No. 961,999 filed Nov. 20, 1978 and now abandoned.

TECHNICAL FIELD AND BACKGROUND OF THE INVENTION

Conveyors in a wide range of types have been used heretofore for handling materials of a wide range of types. Certain conveyors, and more particularly conveyors used with packages such as bottles, cans, and other similar generally cylindrical, somewhat fragile containers normally conveyed in an upright position, have employed chain in various forms.

Particularly in the field of conveyors employed with packages such as containers of the type described, difficulties have been encountered as the industry handling such materials has gone toward one or both of more fragile packages and higher operating speeds. By way of example only, the bottling industry has had occasion to adopt non-returnable bottles which, in order to reduce costs, are more readily breakable than more traditional returnable bottles. Additionally, development of packaging machinery used in bottling and canning plants and the like has achieved higher production rates, necessitating handling of packages in greater volumes per unit of time. Efficient handling of increasing volumes of packages per unit of time has begun to require more positive control over the flow and movement of such packages or objects.

Persons working in the field of conveyors using chains thus are presented with a range of problems. These problems include a need for handling packages at higher speed, a need for avoiding excessive contact pressure between relatively fragile packages, and a need for expanding the usefulness of conveyor chains while maintaining strength needed for accomplishing the operating functions required.

BRIEF SUMMARY OF THE INVENTION

With the above discussion in mind, it is an object of the present invention to provide a conveyor chain of broadened usefulness and which is readily adaptable to a wide range of applications. In realizing this object of the present invention, a conveyor chain having tensile strength characteristics at least comparable to those of previously used roller chain is constructed and used in such a way as to permit accomplishing a range of desired functions. Strength is obtained by the cooperation of a plurality of elongate links and a plurality of pins, with the links and pins being chained together in such a way as to bear and transmit all tensile stress imposed on the chain.

Yet a further object of the present invention is to move fragile packages such as glass containers by means of a chain conveyor while avoiding high pressure contact between such packages. In realizing this object of the present invention, a conveyor chain as contemplated by the present invention cooperates with a plurality of rollers to define a horizontal supporting surface for packages which moves in such a manner as to normally convey packages resting upon the surface while accommodating movement of the conveying surface beneath and relative to obstructed packages. By means of relatively free movement of the conveying surface beneath obstructed packages, the levels of pressure imposed between engaging obstructed packages is relatively low so as to avoid package damage.

Yet a further object of the present invention is to accomplish positive positioning and movement of packages being conveyed. In realizing this object of the present invention, a chain in accordance with the present invention cooperates with associated guides in such a manner as to positively grip packages being conveyed between adjacent pairs of grippers or carriers, thereby permitting the package to be moved at a relatively high rate of speed with the conveyor chain.

BRIEF DESCRIPTION OF DRAWINGS

Some of the objects of the invention having been stated, other objects will appear as the description proceeds, when taken in connection with the accompanying drawings, in which

FIG. 3 is an elevation view, in section, of a portion of the conveyor of FIGS. 1 and 2;

FIG. 4 is a side elevation view, partially broken away and partially in section, of a conveyor chain of the present invention as incorporated into the conveyor of FIGS. 1 through 3;

FIG. 5 is an exploded perspective view of certain components of the chain of FIG. 4;

FIG. 6 is an elevation view, in section, of portions of the chain of FIG. 4, taken generally along the line 6—6 in FIG. 4;

FIG. 7 is a partially schematic, partially broken away view similar to FIG. 2;

FIG. 8 is an elevation view, partially in section, of a portion of the arrangement of FIG. 7, taken generally along the line 8—8 in that Figure;

FIG. 9 is a view similar to FIG. 7, showing an alternative arrangement for certain structure of a low pressure conveyor in accordance with the present invention;

FIG. 10 is a view similar to FIGS. 9 and 7, showing a further alternative arrangement for a low pressure conveyor in accordance with the present invention;

FIGS. 11, 12, 13 and 14 are a series of views similar to FIGS. 4 through 6 and showing an alternative form of conveyor chain of the present invention;

FIGS. 15, 16 and 17 are a series of views similar to FIGS. 12, 13 and 14 and showing a modified form of the conveyor chain of those views;

FIG. 18 is a plan view, partially broken away, of a positive control conveyor incorporating the conveyor chain of the present invention; and FIG. 19 is a perspective view of a component of the conveyor chain used in the conveyor of FIG. 18.

DETAILED DESCRIPTION OF THE INVENTION

Figure 1:
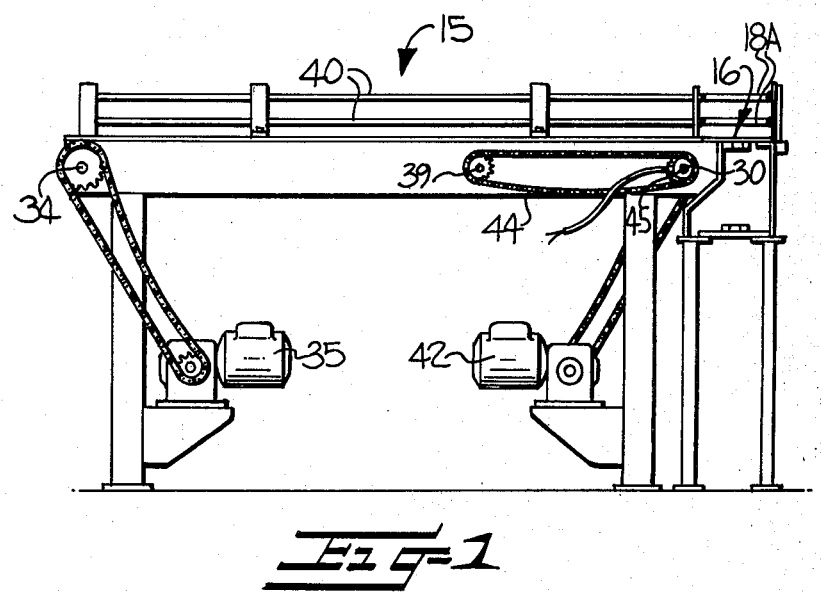
FIG. 1 is an elevation view of a low pressure conveyor embodying the conveyor chain of the present invention as used in a first application.

While the present invention will be described hereinafter with more particular reference to the accompanying drawings, it is to be understood at the outset of the following description that the present invention may be modified by persons skilled in the applicable arts while still achieving operating characteristics consistent with those to be described. Accordingly, the following description is to be read broadly as enabling persons skilled in the applicable arts to fully utilize the present invention, and is not to be read as restricting the scope of the present invention.

Referring now more particularly to FIGS. 1 through 10, a conveyor chain in accordance with the present invention is there shown as incorporated in a low pressure conveyor for packages such as bottles and the like. In the low pressure conveyor of FIGS. 1 through 10, which is generally indicated at 15, packages normally move from one apparatus to another in a bottling or canning plant along a main conveyor line 16, in a direction indicated by arrows. Normally, movement of packages along the main conveyor line 16 is unimpeded, in order to move packages from one apparatus to another along the line. However, in the event that it is necessary to accumulate any number of packages at an intermediate location at which the low pressure conveyor 15 is positioned, a pair of diversion gates 18A and 18B may be pivoted into position across the main conveyor 16. An upstream diversion gate 18A then causes packages moving along the main conveyor 16 to be diverted onto a horizontal conveying surface provided by the low pressure conveyor 15.

In accordance with the present invention, the conveying surface provided by the low pressure conveyor 15 is provided, at least in part, by the particular cooperation of a conveyor chain of a type contemplated by the present invention and shown particularly in FIGS. 4 through 6. As there shown, the conveyor chain comprises a plurality of elongate links 19 and a plurality of pins 20. Preferably, the links 19 are stamped from metallic plate or sheet material, such as stainless steel. Similarly, the pins 20 are formed of a suitable metallic material, such as stainless steel. The pins 20 each penetrate terminal end portions of two pairs of links (FIGS. 4 and 6) for chaining the links into first and second spaced apart side length portions 21A, 21B (FIG. 6). The links 19 and pins 20 cooperate for transmitting tensile stress imposed on the chain. That is, the strength of the chain in bearing, taking up or transmitting tension or pulling force is derived from the links and pins and the chaining together of those elements. As will be noted, when such a chain is tensioned or pulled taut, a straight line through the centers of the pins 20 defines a pitch line. The distance between the centers of adjacent pins 20 is the chain pitch. The distance between the links, in the direction of a pin 20, is the chain width and is a measure of the distance between the first and second spaced apart side length portions.

In accordance with the present invention, the chain of FIGS. 4 through 6 incorporates a plurality of spacer means generally indicated at 21 and, in the form now referred to, most clearly shown in FIG. 5. Preferably the spacer means 21 is an injection molded plastic, but it may be made of sintered or compressed metal or the like. Each spacer means 21 is penetrated by no more than two of the pins 20. Each of the spacer means 21 has a sleeve portion for enclosing a pin and for cooperating with the pin and links which are penetrated by that pin for spacing the side portions. Each of the spacer means 21 has a carrier portion which projects laterally, with respect to the pitch length, from the chain for engaging an object to be moved with the chain. In the form particularly shown in FIGS. 1 through 10 and now being described, the carrier portion defines clip means having a spaced pair of clip slots 24 for receiving rod-like axles 25. The clip means define a supporting surface line spaced at a predetermined distance from the pitch line of the chain (FIGS. 3 and 4). Preferably, each spacer means 21 has a pair of sleeve portions 22 each penetrated by corresponding pin 20. The sleeve portions 22 have sprocket engaging surfaces for transfer of driving force to the chain and functioning in a manner generally similar to the rollers of a conventional roller chain.

It is noted that a conventional roller chain (FIG. 11) is made up of two kinds of links, namely roller links and pin links, which are alternately spaced throughout the length of the chain. In a conventional chain, a roller link consists of two sets of rollers and bushings, with the bushings being press fitted into a pair of link plates. A pin link has two link plates into which are press fitted two pins. When assembled, the two pins fit in the bushings of the two adjacent roller links. In the chain of FIGS. 4 through 6, alternate links 19 span the two sleeve portions 22 of a single spacer means 21, and thus would seemingly at least approach the structure of a roller link. Adjacent alternate links 19 span sleeve portions 22 of adjacent pairs of spacer means 21, chaining together the links and spacer means and functioning somewhat similarly to the pin links of a conventional roller chain.

The conveyor 15 to which the present description is directed comprises sprocket means for mounting pairs of chains as described hereinabove. More particularly, and as made more clear in FIGS. 3 through 10, two pairs of chains constructed as described to this point are mounted on respective sets of sprockets for movement about corresponding endless paths of travel, each including a generally horizontal upper run in which a package supporting horizontal surface is defined. Two such surfaces are provided, one in which package movement is away from the main conveyor 16 and another in which package movement is toward the main conveyor 16, as indicated by arrows in FIG. 2. Referring now more particularly to the package supporting surface moving away from the main conveyor line 16, a cross shaft 30 extending parallel to the main conveyor 16 mounts a spaced pair of inlet end sprockets 31A, 31B about which respective chains pass. The shaft 30 additionally mounts a control mechanism roller 32, for purposes to be described more fully hereinafter. A second cross shaft 34, spaced some distance from the main conveyor 16, mounts a cooperating set of sprockets (not visible in the accompanying drawings) and is driven in rotation by an appropriate motive power means 35 such as an electrical motor. The electrical motor 35, driving the shaft 34, drives the chains entrained about the entry end sprockets 31A, 31B in movement away from the main conveyor 16.

The rod-like axles 25 held within the clip means of the spacer means 21 span the distance between the spaced apart pair of chains which move along the closed path of travel defined by the sprockets mounted on the shafts 30, 34. Due to coordinated drive of the two chains from the shaft 34, the axles 25 are maintained in a parallel array as they move with the chains. Each axle 25 mounts a plurality of rollers 28 which are freely rotatable on the axles 25. The rollers have a predetermined radius no more than the predetermined distance between the pitch line of the chain and the supporting surface line defined by the clip means, in order to maintain free rotatability of the rollers (FIG. 4).

Due to the freely rotatable characteristic of the roller means 28 mounted on the axles 25, the conveyor of FIGS. 1 through 10 accomplishes low pressure engagement of any obstructed packages moving therewith.

More particularly, the weight of a package resting upon the roller means 28 and the axles 25 normally is sufficient to prevent rotation of the roller means 28 relative to the axles 25. In the absence of such rotation, and with the axles 25 moving with the chains in which they are clipped, packages resting upon the horizontal conveying surface are moved with movement of the chains, as briefly described above. However, in the event that movement of the packages is obstructed in any manner, such as by a backing up of packages on the horizontal conveying surfaces of the conveyor 15, relatively little force of engagement against the package is required to overcome the restraint against rotation existing between the roller means 28 and the axle 25. With rotation of roller means 28 relative to the axles 25, the conveyor structure moves easily under any obstructed package, without imposing drag force on that package which would give rise to pressure between the obstructed package and any obstruction such as another package.

The free rotatability of the roller means 28 about the axles 25 opens still other possibilities for controlling rates of packages movement while accommodating low obstruction pressures. In forms of the conveyor here illustrated, advantage is taken of these characteristics to define an acceleration zone generally indicated at AZ in FIG. 2 in which packages coming onto the conveyor 15 are accelerated in movement away from the main conveyor line 16. More particularly, an auxiliary belt 36 is mounted within the closed path of travel of the chains described hereinabove and spans substantially the distance spanned by the axles 25. The auxiliary belt encircles the roll 32 and a spaced secondary roll 38 mounted on a cross shaft 39. As more particularly illustrated in FIGS. 7 and 8, roller means 28 passing about the sprockets mounted on the shaft 30 most closely adjacent the main conveyor line 16 and then moving away from the main conveyor line 16 are brought into engagement with the belt 36, and may be rotated relative to the shafts 25 by any difference in speed between the speed of the chains by which the axles 25 are carried and the belt 36. As indicated by arrows in FIG. 8, where the belt 36 remains stationary, movement of the chains away from the main conveyor line 16 causes the roller means 28 to be driven in rotation in such a direction as to accelerate package movement. Alternatives to this arrangement will be pointed out more fully hereinafter.

Figure 2:
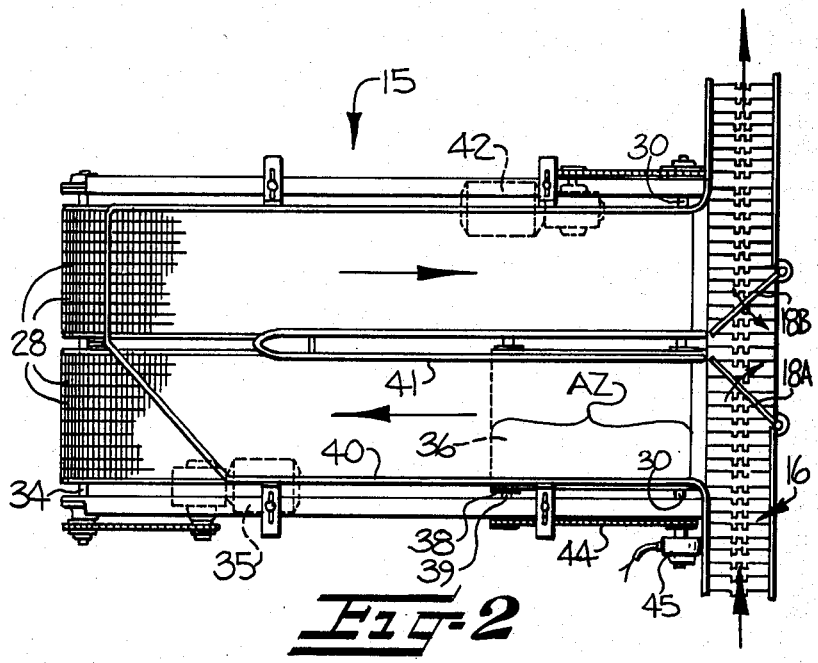
FIG. 2 is a plan view of the conveyor of FIG. 1.

Packages moving away from the main conveyor line 16 onto the low pressure conveyor 15 are guided between outside guide rails 40 and inside guide rails 41. Near an exit end of the conveyor moving away from the main conveyor line 16, the outer guide rails 40 are turned to divert packages onto a conveying surface moving back toward the main conveyor line 16 (FIG. 2). The conveying surface moving back toward the main conveying line 16 is formed in a manner similar to the conveying surface moving away from the main conveyor line 16, namely by the use of a pair of chains as described hereinabove mounting a series of axles in parallel array and with roller means provided on the axles. Sprockets for mounting the second set of chains and associated components are mounted on the shafts 30, 34 as described hereinabove and motive power is provided by suitable means such as an electrical motor 42.

In order to provide a range of possibilities for controlling package movement in a zone such as the acceleration zone AZ described hereinabove, it is contemplated that various provisions may be made for fixing or driving a surface such as the belt 36 which engages the roller means 28 of a conveyor section in accordance with the present invention. Two such variations are illustrated in FIGS. 9 and 10, and the possibilities for selecting drive arrangements will become more clear from the following discussion of FIGS. 7, 9 and 10.

More particularly, in FIG. 7, an auxiliary drive chain 44 is provided for selectively connecting a shaft 39 by which the belt 36 may be driven with the shaft 30 which is driven in rotation by the second drive motor 42. An electromagnetically operated clutch 45 is provided which may selectively connect the drive chain 44 and shaft 39 with the shaft 30 driven by the second motor 42. Should the electromagnetic clutch 45 be energized to couple together those components, then the belt 36 would be driven in a direction opposite to the direction of movement of the chains passing thereabout, providing an increased speed of rotation for the roller means 28 as they move through the acceleration zone AZ. Such an increased speed of rotation for the roller means 28 would thus further accelerate movement of packages away from the main conveyor line 16. Alternatively, and as illustrated in FIG. 9 where comparable reference characters of a 100 order series have been used, the clutch 145 may be effective to couple the drive chain 144 to the sprocket 131A, causing the belt 136 to move in the same direction and at the same speed as the chains carrying the axles 125 and the rollers 128 mounted thereon. In such event, a greater resistance would be imposed to relative rotation of the roller means 128 about their corresponding axles 125, opening the possibility of exerting a greater pressure of engagement between an obstructed package and any obstruction. Further, and as illustrated in FIG. 10 where reference characters of a 200 order series have been applied, an independent motor 246 operating if desired through an appropriate variable speed transmission or other speed control unit 248 may drive the shaft 239 in whatever rotational direction and at whatever rotational speed is desired, in order to provide either a retardation zone or an acceleration zone by controlling rotation of the rollers 228.

The present invention contemplates that the carrier means, such as are shown in FIGS. 4 through 6 and are described above as spacer means, may take other forms. In particular, two such forms are illustrated in FIGS. 11 through 17, in which reference characters consistent with those applied in FIGS. 4 through 6 are used with the addition of a postscript B for one form in FIGS. 11 through 14 and a postscript C for the form of FIGS. 15 through 17. The distinction between the forms of FIGS. 11 through 17 and those of FIGS. 4 through 6 resides in the pin enclosing portions of the carrier means of FIGS. 11 through 17 being formed as parallel, spaced apart leg portions 27B, 27C for receiving and for gripping therebetween the side length portions of a substantially conventionally roller chain. That is, the depending leg portions 27B, 27C (FIGS. 12 and 15) straddle or extend downwardly beside the lengths of the chain. Holes (FIG. 14) or recesses (FIG. 17) are provided for a snap lock engagement with the ends of the link penetrating pins. The distinction between the form of FIGS. 11 through 14 and that of FIGS. 15 through 17 is that the outer surface of the second form (FIGS. 15 through 17) is smooth and unbroken by any opening aligned with the pins. Stated differently, the recesses which receive the pins are "blind" or closed at the outer surfaces thereof. This may be deemed desirable for some circumstances where cleanliness or protection of pins in a roller chain is deemed to be of significance.

The conveyor chain of the present invention, as described hereinabove, is contemplated as having utility beyond the low pressure conveyor 15 of FIGS. 1 through 10. One such further use of the conveyor chain described is illustrated in FIGS. 18 and 19, where comparable reference characters of a 300 order series have been applied. As there shown, the carrier portion of the spacer means 321 defines gripper means having gripping surfaces. Packages, such as bottles B are guided by appropriate guide means such as guide rods 340 to be inserted between the carrier portions of adjacent spacer means in a conveyor chain, as the conveyor chain is passed about a sprocket. At such position, the carrier portions of adjacent spacer means are separated, so that objects to be carried with the conveyor may be inserted there into. As the conveyor chain completes its turn about the sprocket and goes forward into a straight line run, the carrier portions of adjacent spacer means are moved closer together, gripping a package such as the bottle B firmly between a pair of carrier portions. Such positive engagement with a package permits handling of the package at elevated speeds, by providing more accurate positioning and control over the package. In the particular form illustrated, the conveyor of FIGS. 18 and 19 has sprocket means arranged so that the chain moves in a horizontal plane and bottles moving to the conveyor chain and transported thereby may be supported by underlying conveying surfaces where appropriate.

In the drawings and specification, there has been set forth a preferred embodiment of the invention, and although specific terms are employed, they are used in a generic and descriptive sense only and not for purposes of limitation.

That which is claimed is:

1. A low contact pressure conveyor for packages such as containers and comprising
    a pair of conveyor chains, each having
        a plurality of elongate, plate links,
        a plurality of pins each penetrating terminal end portions of two pairs of said links for chaining said links into first and second spaced apart side length portions,
        said links and said pins cooperating for bearing tensile stress imposed on said chain,
        said pins defining a pitch line for said chain, and
        a plurality of plastic spacer means, each penetrated by two of said pins, each having a pair of sleeve portions for enclosing respective pins and cooperating with said pins and links penetrated thereby for spacing said side length portions, and each having a carrier portion projecting laterally from said chain intermediate said side length portions and defining clips means for receiving and gripping a rod-like object to be moved with said chain,
        said clip means defining a supporting surface line spaced at a predetermined distance from said pitch line of said chain,
    sprocket means mounting said chains for movement along parallel, spaced apart endless paths of travel defining a horizontal upper run,
    a plurality of elongate axles each spanning said endless paths of travel and having terminal end portions gripped by a spaced pair of said clip means, said axles being arranged in a parallel array defining a horizontal supporting surface and movable with said chains,
    roller means encircling said axles for supporting packages to be conveyed by movement of said chains and rotatable relative to said axles for accommodating movement thereof beneath supported packages in the event of blockage of movement of such packages, said roller means having a predetermined radius no more than said predetermined distance between said pitch line and said supporting surface line for maintaining free rotatability, and
    drive means operatively connected with said sprocket means for driving said chains in coordinated movement for conveying supported packages while maintaining alignment of said axles.

2. A low contact pressure conveyor for packages such as containers and comprising
    a conveyor chain having
        a plurality of elongate, plate links,
        a plurality of pins each penetrating terminal end portions of two pairs of said links for chaining said links into first and second spaced apart side length portions,
        said links and said pins cooperating for bearing tensile stress imposed on said chain,
        said pins defining a pitch line for said chain, and
        a plurality of plastic spacer means, each penetrated by two of said pins, each having a pair of sleeve portions for enclosing respective pins and cooperating with said pins and links penetrated thereby for spacing said side length portions, and each having a carrier portion projecting laterally from said chain and defining clip means for receiving and gripping a rod-like object to be moved with said chain,
        said clip means defining a supporting surface line spaced at a predetermined distance from said pitch line of said chain,
    sprocket means mounting said chain for movement along an endless path of travel defining a horizontal upper run,
    a plurality of elongate axles each extending transversely of said endless path of travel and having a portion thereof gripped by said clip means, said axles being arranged in a parallel array defining a horizontal supporting surface and movable with said chain,
    roller means encircling said axles for supporting packages to be conveyed by movement of said chain and rotatable relative to said axles for accommodating movement thereof beneath supported packages in the event of blockage of movement of such packages, said roller means having a predetermined radius no more than said predetermined distance between said pitch line and said supporting surface line for maintaining free rotatability, and
    drive means operatively connected with said sprocket means for driving said chain for conveying supported packages while maintaining alignment of said axles.

3. A low constant pressure conveyor for packages such as containers and comprising
    a pair of conveyor chains, each having
        a plurality of elongate, plate links,
        a plurality of pins each penetrating terminal end portions of two pairs of said links for chaining said links into first and second spaced apart side length portions, said links and said pins cooperating for bearing tensile stress imposed on said chain, said pins defining a pitch line for said chain, and a plurality of plastic spacer means for spacing apart said side length portions, each spacer means being penetrated by two of said pins and each having a carrier portion projecting laterally from said chain intermediate said side length portions and defining clip means for receiving and gripping a rod-like object to be moved with said chain, said clip means defining a supporting surface line spaced at a predetermined distance from said pitch line of said chain, sprocket means mounting said chains for movement along parallel, spaced apart endless paths of travel defining a horizontal upper run, a plurality of elongate axles each spanning said endless paths of travel and having terminal end portions gripped by a spaced pair of said clip means, said axles being arranged in a parallel array defining a horizontal supporting surface and movable with said chains, roller means encircling said axles for supporting packages to be conveyed by movement of said chains and rotatable relative to said axles for accommodating movement thereof beneath supported packages in the event of blockage of movement of such packages, said roller means having a predetermined radius no more than said predetermined distance between said pitch line and said supporting surface line for maintaining free rotatability, and drive means operatively connected with said sprocket means for driving said chains in coordinated movement for conveying supported packages while maintaining alignment of said axles.

4. A low contact pressure conveyor for packages such as containers and comprising a conveyor chain having a plurality of elongate, plate links, a plurality of pins each penetrating terminal end portions of two pairs of said links for chaining said links into first and second spaced apart side length portions, said links and said pins cooperating for bearing tensile stress imposed on said chain, said pins defining a pitch line for said chain, and a plurality of plastic spacer means for spacing apart said side length portions, each spacer means being penetrated by two of said pins and each having a carrier portion projecting laterally from said chain intermediate said side length portions and defining clip means for receiving and gripping a rod-like object to be moved with said chain, said clip means defining a supporting surface line spaced at a predetermined distance from said pitch line of said chain, sprocket means mounting said chain for movement along an endless path of travel defining a horizontal upper run, a plurality of elongate axles each extending transversely of said endless path of travel and having a portion thereof gripped by said clip means, said axles being arranged in a parallel array defining a horizontal supporting surface and movable with said chain, roller means encircling said axles for supporting packages to be conveyed by movement of said chain and rotatable relative to said axles for accommodating movement thereof beneath supported packages in the event of blockage of movement of such packages, said roller means having a predetermined radius no more than said predetermined distance between said pitch line and said supporting surface line for maintaining free rotatability, and drive means operatively connected with said sprocket means for driving said chain for conveying supported packages while maintaining alignment of said axles.

5. A conveyor according to any one of claims 1, 2, 3 and 4 wherein each of said carrier means has sprocket engaging surfaces for transfer of driving force to said chain.

6. A conveyor according to any one of claims 1, 2, 3 and 4 further comprising control surface means underlying said horizontal supporting surface defined by said axles and for engaging said roller means during movement of said roller means thereabove, whereby said roller means are driven in rotation about said axles in correlation to the relative velocities of said axles and said control surface means and the movement of supported packages is controlled.

7. A conveyor according to claim 6 wherein said control surface means comprises a belt for engaging said roller means, and motive means for controllably driving said belt in movement and thereby for controllably driving said roller means in rotation.

8. A conveyor according to claim 7 wherein said motive means drives said belt in the same direction of movement as said conveyor chains for slowing the movement of supported packages.

9. A conveyor according to claim 7 wherein said motive means drives said belt in the opposite direction of movement of said conveyor chains for accelerating the movement of supported packages.

* * * * *